United States Patent Office 3,267,348
Patented August 16, 1966

3,267,348
GENERATOR RE-POLARIZING SYSTEM
Aldo Mariani Marini, Elmont, N.Y., assignor, by mesne assignments, to P. & D. Manufacturing Company, Inc., a subsidiary of the Bendix Corporation, Long Island City, N.Y., a corporation of Delaware
Filed Apr. 18, 1963, Ser. No. 274,004
6 Claims. (Cl. 320—25)

This invention relates to electrical generators, and more particularly to a system for polarizing the field coils of a direct current electrical generator when said generator is used either to charge a battery or in parallel with some other direct current source.

When a D.C. generator is electrically connected in parallel with another D.C. source it is often desirable that the electric polarity of the two sources be the same at the points of their common electrical connection. Thus, for example, when a battery is being charged by a D.C. generator the current emanating from the generator must flow through the battery in a direction opposite to the direction of discharge of the battery, that is to say, in a direction opposite to the current generated by the battery itself. If this is not the case, not only will the charging process be ineffectual, but also, the battery as well as intermediate elements of the circuitry, such as for example resistors or electrical relays, may be damaged.

Incorrect polarity might occur not only if the two sources are inadvertently wired together improperly, but also as a result of transients in the field coil of the generator or of a loss of residual magnetism in the field coil following a shutdown of the generator. It would be desirable to provide a means for obtaining the proper polarity without a shutdown of the system and/or reliance upon the skill and vigilance of an attendant.

It is, therefore, an object of this invention to provide a method and circuit for palirizing a direct current generator.

It is a further object of this invention to provide a method and circuit for polarizing a direct current generator capable of use without a shutdown of the generator.

It is a still further object of this invention to provide a method and circuit for charging a battery with a minimum of supervision.

Speaking generally, in this invention the current emanating from a battery having a fixed polarity is used to repolarize a direct current generator, if and when the current emanating from the generator flows through the battery in a direction coincident with the direction of discharge of the battery. Circuitry is provided for accomplishing this repolarization automatically and with a minimum of manual supervision.

The nature and substance of this invention as well as its objects and advantages will be more clearly perceived and fully understood by referring to the following description and claims taken in connection with the accompanying drawing in which:

Figure 1:
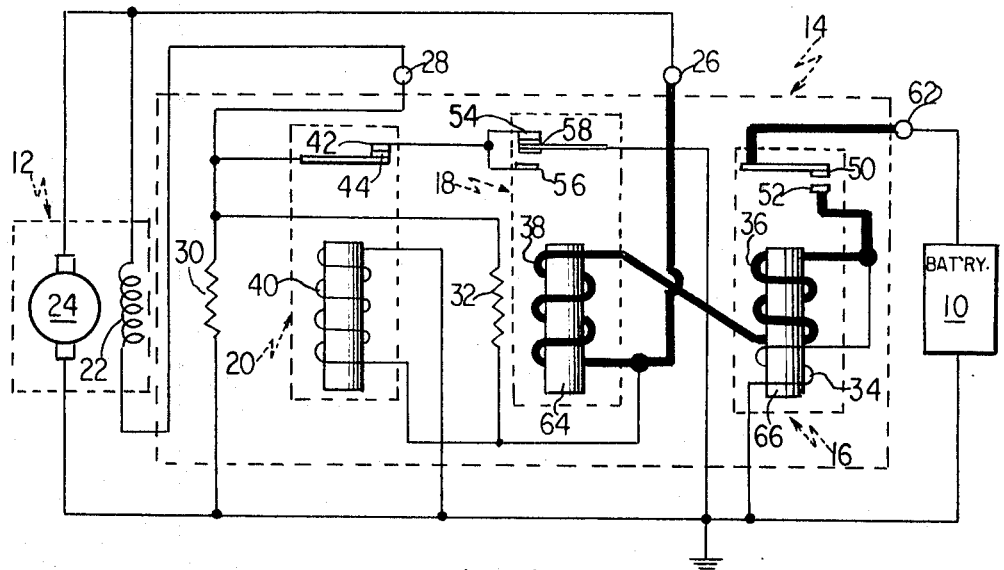
FIG. 1 is an electrical schematic diagram of one embodiment of this invention.

Referring to FIG. 1 in which one embodiment of this invention is set forth, a battery 10 is electrically connected to a direct current generator 12 through intermediate circuitry 14 consisting in part of three electromagnetic relays 16, 18, and 20 which function respectively as a battery cutout switch, a current limiting switch, and a voltage regulating switch. In the following description of the embodiment of this invention shown in FIG. 1, it will be assumed initially that due, for example, to transients in field coil 22 of the generator 12, a loss of residual magnetism in field coil 22, or improper wiring, field coil 22 is incorrectly polarized and the output voltage of the generator 12 is additive with rather than in parallel with or opposed to that of battery 10. In such a situation, the current emanating from generator 12 would flow through battery 10 in the same direction as the current emanating from the battery and it would be discharging rather than charging the battery.

The embodiment shown in FIG. 1 utilizes a direct current generator 12 having a field coil 22 of relatively high resistance. Accordingly, most of the generator current from the armature 24 of the generator flows into the charging circuit 14 through the armature terminal 26 rather than the field terminal 28. Moreover, since the two resistors 30, 32 shown in FIG. 1 are selected to be relatively high in resistive value, most of the generator current flows through the control coils 34, 36, 38, 40 of the various electromagnetic relays or switches 16, 18, 20.

Electromagnetic relay 20 which serves as a voltage regulating switch is selected so that its normally closed contacts 42, 44 open only when the value of the current flowing through its control coil 40 is more than a predetermined amount. This relay serves to protect battery 10 and the various other circuit elements from damage if there is an unexpected surge of current due, for example, to a short circuit across the generator's load.

Electromagnetic relay 16 which serves as a battery cutout switch has two control windings, one 34 of higher resistance than the other 36, and each controlling a pair of normally open contacts 50, 52 which lead to battery 10. Due to the high surges of current which flow through this pair of contacts, an electromagnetic relay 16 having contacts 50, 52 which have snap action in closing and opening is used, so that the contacts make and break quickly, and burnout, bounce and vibration of the contacts are minimized.

Electromagnetic relay 18 which serves as a current limiting switch has a pair of contacts 54 and 56, the first of which is normally closed, and the second of which is normally open with respect to the relay's armature contact 58. It has a single control winding 38 which has a relatively low resistance.

When generator 12 and battery 10 are connected so that the former is discharging rather than charging the latter, the generator current, after flowing through armature terminal 26 of the charging circuit 14, flows to ground through the high resistance coil 34 of the battery cutout switch 16. This closes the normally open contacts 50, 52 of the electromagnetic switch 16 and completes a circuit from generator 12 to battery 10 through the charging circuit's battery terminal 62, the low resistance control coil 36 of the battery cutout switch 16, and the control coil 38 of the current limiting switch 18.

Since the current emanating from generator 12 and that from battery 10 are flowing in the same direction, they add to each other and send a surge of current through control coil 38 of current limiting switch 18 and the low resistance control coil 36 of battery cutout switch 16. Since the normally open contacts 50, 52 of the latter switch are already in engagement, this surge does not change their relation; but, if the surge be greater than the predetermined current value to which control coil 38 of the former switch is responsive, the magnetic field induced in this switch's core 64 will disengage the armature contact 58 from the normally closed contact 54 and bring it into engagement with the normally open contact 56.

When the normally closed contact 54 of current limiting switch 18 is open, the magnetizing current to generator field coil 22 is substantially interrupted, and the generator output is thereby reduced to almost zero. With the generator field collapsed, substantially no current flows from generator 12 to battery 10. Since the resistance of generator armature 24 is very low, a large amount of battery current will continue to flow through both the low resistance coil 36 of the battery cutout switch 16 holding its contacts closed, and control coil 38 of current limiting switch 18 holding the latter's armature 58 in engagement with its normally open contact 56. This permits battery current to repolarize generator field coil 22 by flowing to ground through these two coils 36, 38, the field coil 22, and the closed contacts 56, 58 of the current limiting switch 18.

Current limiting switch 18 is selected so that the time taken by its armature contact 58 to open the normally closed contact 54 and then close the normally open contact 56, in response to the surge of battery and generator current, is long enough for the original magnetizing current flowing through generator field coil 22 to be reduced to a value sufficiently low for the current emanating from battery 10 to repolarize the field coil by the time that armature contact 58 and the normally open contact 56 close. This is so since the original magnetizing current does not fall immediately to zero when the normally closed contact 54 is open; instead there is a transient decay.

Generator 12 is now properly polarized; its output voltage is opposing the voltage of battery 10, and its current is opposing the current generated by the battery. Since the two currents are now in opposition, their algebraic sum (i.e., sum according to sign) is the difference of their absolute values (values without regard to sign) and in absolute terms they thus subtract from one another where coincident, rather than add. The current through both the low resistance coil 36 of battery cutout switch 16 and control coil 38 of current limiting switch 18 thus decreases to a value insufficient to hold their respective normally open contacts 50, 52, 56 closed, and the current through the high resistance coil 34 of the battery cutout switch reverses in direction.

Armature 58 of current limiting switch 18 therefore reengages with its normally closed contact 54. Moreover, the normally open contacts 50, 52 of battery cutout switch 16 open when the diminishing current in the high resistance control coil 34 of switch 16 falls below the predetermined value necessary to magnetize its electromagnetic core 66 sufficiently to hold the contacts 50, 52 engaged. Due to the reversal of generator current, however, the current in the latter coil 34 will continue to diminish, pass through zero, and increase in the opposite direction. When it increases to a predetermined value which develops a magnetic field in its electromagnetic core 66 sufficient to close its contacts 50, 52, battery 10 is reconnected to the charging system. The system then operates normally with generator 12 properly charging the battery.

Figure 2:
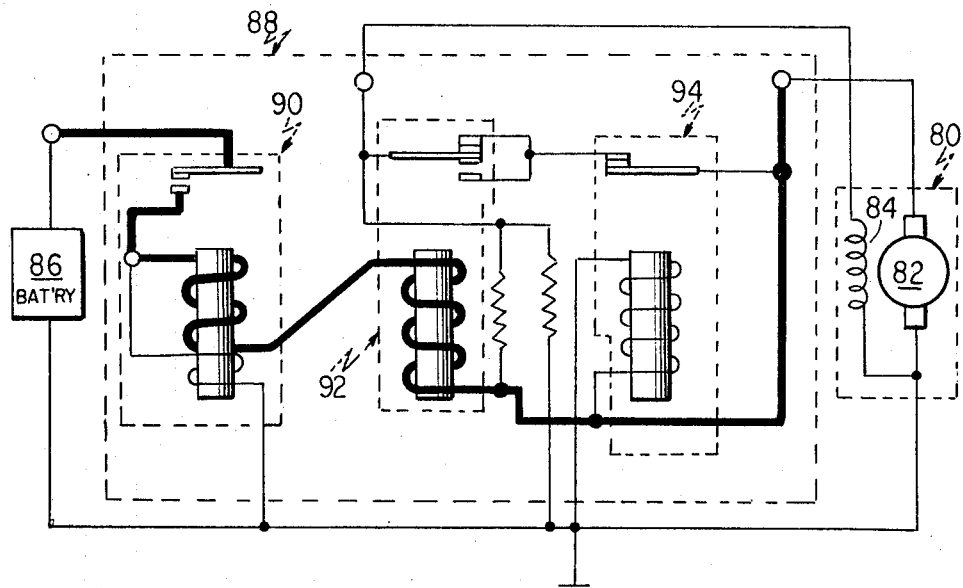
FIG. 2 is an electrical schematic diagram of another embodiment of this invention.

Referring next to FIG. 2 which sets forth an alternative embodiment of this invention, it will be noted that the circuit is quite similar to that of FIG. 1. A generator 80 with an armature 82 and a field coil 84 is electrically connected to a battery 86 through an intermediate charging circuit 88. The charging circuit includes a first electromagnetic relay 90 functioning as a battery cutout switch, a second electromagnetic relay 92 functioning as a current limiting switch, and a third electromagnetic relay 94 functioning as a voltage regulating switch. Each of these relays co-acts with the other substantially as described in reference to FIG. 1, the main difference between the two embodiments being that in FIG. 1 the field coil 22 is grounded through the contacts of voltage regulating switch 20 and current limiting switch 18, whereas in FIG. 2 the field coil 84 is connected directly to the armature 82 ground.

Although this invention has been described with a certain degree of particularity, it is understood that the present disclosure has been made only by way of example, and that numerous changes in the details of construction and method of operation and in the combination and arrangement of components may be resorted to without departing from the spirit and scope of the invention as hereinafter claimed.

What is claimed is:
1. A circuit for charging a battery having a first and a second output terminal by using a direct current generator having an armature winding and a field coil, comprising (1) a first relay core of electromagnetic material; (2) a first conductor wound about said first relay core and having first and second endpoints; (3) a second conductor wound about said first relay core and having a first endpoint connected to the second output terminal of the battery and a second endpoint connected to the first endpoint of said first conductor; (4) a first pair of contact points consisting of a first contact point connected to the first output terminal of the battery and a second contact point connected to the first endpoint of the said first conductor, which pair of contact points are positionally responsive to the character of the electrical current flowing through the said first and second conductors in such a manner that said first pair of contact points are in electrical contact with one another when the current in the said first and second conductors is above a predetermined amount, and not in electrical contact with one another when the current in the said first and second conductors is below a predetermined amount; (5) a second relay core of electromagnetic material; (6) a third conductor wound about said second relay core and having a first endpoint connected to the second endpoint of said first conductor and a second endpoint connected to both the armature winding of the generator and the field coil of the generator; and (7) a trio of contact points comprising first and second contact points connected to each other and a third contact point connected to the second output terminal of the battery, which trio of contact points are positionally responsive to the character of the electrical current flowing through the said third conductor in such a manner that the first and third contact points are in electrical contact with one another when the current in the said third conductor is below a predetermined amount, and the second and third contact points are in electrical contact with one another when the current in the said third conductor is above a predetermined amount.

2. A circuit for charging a battery having a first and a second output terminal by using a direct current generator having an armature winding and a field coil, comprising (1) a first relay core of electromagnetic material; (2) a first conductor wound about said first relay core and having first and second endpoints; (3) a second conductor wound about said first relay core and having a first endpoint connected to the second output terminal of the battery and a second endpoint connected to the first endpoint of said first conductor; (4) a first pair of contact points consisting of a first contact point connected to the first output terminal of the battery and a second conact point connected to the first endpoint of the said first conductor, which pair of contact points are positionally responsive to the character of the electrical current flowing through the said first and second conductors in such a manner that said first pair of contact points are in electrical contact with one another when the current in the said first and second conductors is above a predetermined amount, and not in electrical contact with one another when the current in the said first and second conductors is below a predetermined amount; (5) a second relay core of electromagnetic material; (6) a third conductor wound about said second relay core and having a first endpoint connected to the second endpoint of said first conductor and a second endpoint connected to the armature winding of the generator; and (7) a trio of contact points comprising first and second contact points connected to each other and a third contact point connected to the second output terminal of the battery, which trio of contact points are positionally responsive to the character of the electrical current flowing through the said third conductor in such a manner that the first and third contact points are in electrical contact with one another when the current in the said third conductor is below a predetermined amount and the second and third contact points are in electrical contact with one another when the current in the said third conductor is above a predetermined amount.

3. A circuit for charging a battery having a first and a second output terminal by using a direct current generator having an armature winding and a field coil, comprising (1) a first relay core of electromagnetic material; (2) a first conductor wound about said first relay core and having first and second endpoints; (3) a second conductor wound about said first relay core and having a first endpoint connected to the second output terminal of the battery and a second endpoint connected to the first endpoint of said first conductor; (4) a first pair of contact points consisting of a first contact point connected to the first output terminal of the battery and a second contact point connected to the first endpoint of the said first conductor, which pair of contact points are positionally responsive to the character of the electrical current flowing through the said first and second conductors in such a manner that said first pair of contact points are in electrical contact with one another when the current in the said first and second conductors is above a predetermined amount and not in electrical contact with one another when the current in the said first and second conductors is below a predetermined amount; (5) a second relay core of electromagnetic material; (6) a third conductor wound about said second relay core and having a first endpoint connected to the second endpoint of said first conductor and a second endpoint connected to both the armature winding of the generator and the field coil of the generator; (7) a first resistive element having first and second endpoints, the second endpoint connected to the second endpoint of the said third conductor; (8) a second resistive element having a first endpoint connected to the first endpoint of said first resistive element and a second endpoint connected to the second output terminal of the battery; (9) a trio of contact points comprising first and second contact points connected to each other and a third contact point connected to the second output terminal of the battery, which trio of contact points are positionally responsive to the character of the electrical current flowing through the said third conductor in such a manner that the first and third contact points are in electrical contact with one another when the current in the said third conductor is below a predetermined amount and the second and third contact points are in electrical contact with one another when the current in the said third conductor is above a predetermined amount; (10) a third relay core of electromagnetic material; (11) a fourth conductor wound about said third relay core and having a first endpoint connected to the second output terminal of the battery and a second endpoint connected to the second endpoint of said first resistive element; and (12) a second pair of contact points consisting of a first contact point connected to the first endpoint of the said second resistive element and a second contact point connected to the first and second contact points of the said trio of contact points, which pair of contact points are positionally responsive to the voltage across the first and second endpoints of the said fourth conductor in such a manner that they are in electrical contact when the voltage is within a predetermined range.

4. A circuit for charging a battery having a first and a second output terminal by using a direct current generator having an armature winding and a field coil, comprising (1) a first relay core of electromagnetic material; (2) a first conductor wound about said first relay core and having first and second endpoints; (3) a second conductor wound about said first relay core and having a first endpoint connected to the second output terminal of the battery and a second endpoint connected to the first endpoint of said first conductor; (4) a first pair of contact points consisting of a first contact point connected to the first output terminal of the battery and a second contact point connected to the first endpoint of the said first conductor, which pair of contact points are positionally responsive to the character of the electrical current flowing through the said first and second conductors in such a manner that said first pair of contact points are in electrical contact with one another when the current in the said first and second conductors is above a predetermined amount and not in electrical contact with one another when the current in the said first and second conductors is below a predetermined amount; (5) a second relay core of electromagnetic material; (6) a third conductor wound about said second relay core and having a first endpoint connected to the second endpoint of said first conductor and a second endpoint connected to the armature winding of the generator; (7) a first resistive element having first and second endpoints, the second endpoint connected to the second endpoint of the said third conductor; (8) a second resistive element having a first endpoint connected to the first endpoint of said first resistive element and a second endpoint connected to the second output terminal of the battery; (9) a trio of contact points comprising first and second contact points connected to each other and a third contact point connected to the second endpoint of the said second resistive element, which trio of contact points are positionally responsive to the character of the electrical current flowing through the said third conductor in such a manner that the first and third contact points are in electrical contact with one another when the current in the said third conductor is below a predetermined amount and the second and third contact points are in electrical contact with one another when the current in the said third conductor is above a predetermined amount; (10) a third relay core of electromagnetic material; (11) a fourth conductor wound about said third relay core and having a first endpoint connected to the second output terminal of the battery and a second endpoint connected to the second endpoint of said first resistive element; and (12) a second pair of contact points consisting of a first contact point connected to the first endpoint of the said second resistive element and a second contact point connected to the first and second contact points of the said trio of contact points, which pair of contact points are positionally responsive to the voltage across the first and second endpoints of the said fourth conductor in such a manner that they are in electrical contact when the voltage is within a predetermined range.

5. The circuit set forth in claim 3 wherein the said first pair of contact points make and break contact with each other in response to changes in the character of the electrical current flowing through the said first and second conductors with electro-mechanical snap action.

6. The circuit set forth in claim 4 wherein the said first pair of contact points make and break contact with each other in response to changes in the character of the electrical current flowing through the said first and second conductors with electro-mechanical snap action.

References Cited by the Examiner

UNITED STATES PATENTS 2,711,504   6/1955   King _____ 322—6 X

JOHN F. COUCH, *Primary Examiner.*

MAX L. LEVY, LLOYD McCOLLUM, *Examiners.*

S. WEINBERG, *Assistant Examiner.*